(No Model.)
W. P. & R. P. THOMPSON.
RADIATOR FOR HEATING AIR.
No. 370,830. Patented Oct. 4, 1887.
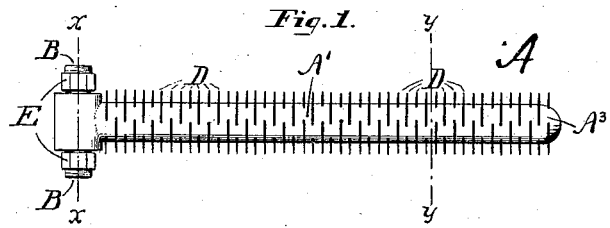
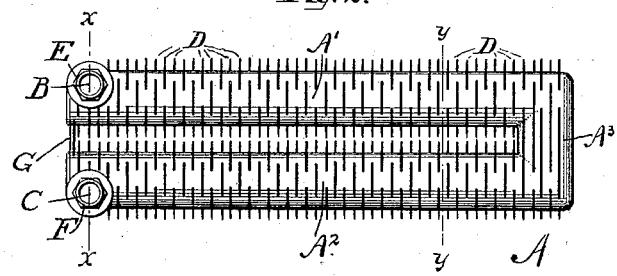
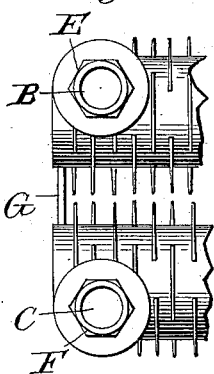
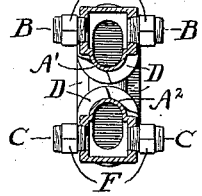
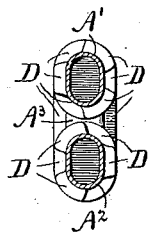
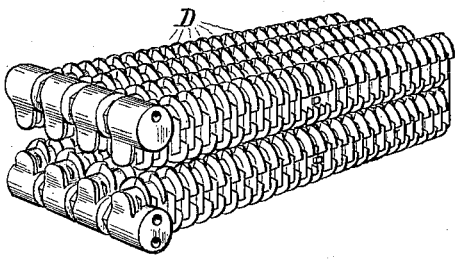
WITNESSES:
Geo. McArthur
Van Wyck Budd
INVENTORS
Wm P. Thompson
Robt P. Thompson
by their atty
Lloyd Wiegand

UNITED STATES PATENT OFFICE.

WILLIAM P. THOMPSON AND ROBERT P. THOMPSON, OF PHILADELPHIA, PENNSYLVANIA.

RADIATOR FOR HEATING AIR.

SPECIFICATION forming part of Letters Patent No. 370,830, dated October 4, 1887.

Application filed January 2, 1886. Serial No. 187,344. (No model.)

*To all whom it may concern:*

Be it known that we, WILLIAM P. THOMPSON and ROBERT P. THOMPSON, citizens of the United States, residing at Philadelphia, in the county of Philadelphia and State of Pennsylvania, have invented certain new and useful Improvements in Radiators for Heating Air; and we do hereby declare the following to be a sufficiently full, clear, and exact description thereof as to enable others skilled in the art to make and use the said invention.

This invention relates to radiators for heating air for the purpose of warming and ventilating apartments by means of steam or hot water circulated inside the radiators, heating the same while air-currents pass between and around outside them.

The object of this invention is to provide a prompt and effective circulation of steam or hot water throughout and prompt and thorough expulsion of air from all parts of the radiators when assembled in nests for use and the avoidance of strains upon the joints by unequal local expansion and contraction, together with the greater facility of accurate fitting and easy and substantial erection of the radiators in nests for use.

The said invention may be briefly stated to consist of a looped or returned tube having long horizontal arms, with heat-conducting projections cast thereon and two contiguous orifices with parallel axes upon each side, which, for the purpose of connecting to the adjoining radiator, are screw-threaded with right and left tapering threads to fit upon correspondingly right and left threaded tapering nipples. The free ends of said looped tubes being united by a web of metal, such web is severed in the process of erecting, that the elasticity of the looped tube may facilitate the tightening of the nipples uniting the several radiators in each nest.

We will now proceed to fully and particularly describe the mode of making and using the said invention, referring to the drawings annexed and the letters of reference marked thereon.

Figure 1 shows a plan of a radiator containing this invention; Fig. 2, a side elevation thereof; Fig. 3, a section in the plane indicated by the dotted line $x\ x$ in Figs. 1 and 2; Fig. 4, a section in the plane indicated by the dotted line $y\ y$ in Figs. 1 and 2; Fig. 5, a number of radiators assembled in a nest for use; and Fig. 6 is an enlarged view of a portion of a radiator, illustrating more fully the frangible web uniting the limbs of the radiator.

The same letters of reference apply to the same parts in the several figures.

A is a tube of cast metal, preferably of oval or flattened section, with the larger axis vertical, consisting of two horizontal limbs, A' and $A^2$, united by the bend $A^3$, and having at its highest point or end an inlet, B, opening from both sides into the limb A', and at its lowest point or other end an outlet, C, opening upon both sides from the limb $A^2$. The axes of the inlet B and the outlet C are parallel, and the inlet and outlet are threaded with right conical screw-threads upon one side of the radiator and left conical screw-threads upon the other side.

Upon the sides of the limbs A' and $A^2$ and the bend $A^3$ are formed projecting vertical webs D, which serve to augment the heat-conducting surface in contact with the air and brace the tubes A' and $A^2$ transversely without impairing their elasticity.

E and F are nipples or short tubes made conical and screw-threaded upon both ends, the thread upon one end of each being right and the opposite end left, and fitting accurately in the conical screw-threads of the inlets B and outlets C of the radiators. The central portion of the nipples E and F are made polygonal to fit a wrench for turning them.

Between the limbs A' and $A^2$, near the inlet B and outlet C, is cast a thin web or brace of metal, G, which during the operation of threading the inlet B and outlet C serves to hold them in position and facilitates threading of the openings with a correct parallelism of axes, also handling and transportation without breakage, and upon being severed permits free play for the usual local expansion in the use of and the full elasticity of the limbs A' and $A^2$, to allow the nipples E and F to be screwed home tightly in their places and thus make a perfectly fluid-tight connection between the contiguous inlets and outlets of the radiator as arranged in nests for use.

When erected for use, steam or hot water is admitted in the inlet B of the first radiator of the series or nest, the farther inlet of the last one being closed, and rapidly flows into all of the radiators of the nest, driving the air before it, and the condensed water or cooled water is discharged from the outlet C of one of the end radiators of the nest, the outlet C of the other end radiators being closed. In passing through the radiators the steam or hot water heats the radiator, which in turn heats the air rising up between the projections or webs D and is in contact with the limbs A' and A². By heating the several radiators of the nest simultaneously strains from local expansion are avoided or greatly reduced, so as to be within the safe limits of elasticity of the material, and leaking of joints from this cause is avoided.

We are aware that radiators have been made in which a returning circulation was guided by internal partitions from and to parallel inlet and outlet openings; also that tubular radiators having limbs connected tubularly at both ends have been made. Such radiators differ from this invention in not being elastic between the inlet and outlet openings, and are hereby disclaimed.

Having described our invention and the mode of constructing and operating the same, what we claim is—

1. A radiator for heating air, consisting of parallel tubular limbs A' and A², tubularly united only by the bend A³, and provided with inlet and outlet openings C, both having conical right and left screw-threads with parallel axes formed therein, substantially as and for the purpose set forth.

2. A radiator for heating air, consisting of the tubular limbs A' and A², tubularly united at one end by the bend A³, and provided with right and left threaded conical apertures at the opposite sides, in combination with the thin frangible brace G, uniting the limbs A' and A² and easily severable when the radiator is set up for use, substantially as and for the purpose set forth.

WM. P. THOMPSON.
ROBT. P. THOMPSON.

Witnesses:
J. DANIEL EBY,
GEO. MCARTHUR.